(12) United States Patent
Bukowski et al.

(10) Patent No.: US 7,990,397 B2
(45) Date of Patent: Aug. 2, 2011

(54) IMAGE-MAPPED POINT CLOUD WITH ABILITY TO ACCURATELY REPRESENT POINT COORDINATES

(75) Inventors: Richard William Bukowski, Orinda, CA (US); Yuelin Chen, San Ramon, CA (US); Mark Damon Wheeler, San Ramon, CA (US); Christopher Robin Thewalt, Lafayette, CA (US)

(73) Assignee: Leica Geosystems AG, Heerbrugg (CH)

( * ) Notice: Subject to any disclaimer, the term of this patent is extended or adjusted under 35 U.S.C. 154(b) by 671 days.

(21) Appl. No.: 11/649,539

(22) Filed: Jan. 4, 2007

(65) Prior Publication Data

US 2008/0088623 A1 Apr. 17, 2008

Related U.S. Application Data

(60) Provisional application No. 60/851,444, filed on Oct. 13, 2006.

(51) Int. Cl.
*G09G 5/00* (2006.01)
*G06T 15/40* (2011.01)

(52) U.S. Cl. ........................ 345/642; 345/422

(58) Field of Classification Search .................. 345/422, 345/642
See application file for complete search history.

(56) References Cited

U.S. PATENT DOCUMENTS

| | | | | |
|---|---|---|---|---|
| 5,870,220 A * | 2/1999 | Migdal et al. | ............... | 359/216.1 |
| 5,988,862 A | 11/1999 | Kacyra et al. | .................. | 364/578 |
| 7,477,360 B2 * | 1/2009 | England et al. | ............... | 356/4.01 |
| 2004/0222988 A1 * | 11/2004 | Donnelly | ....................... | 345/419 |

OTHER PUBLICATIONS

Jon Steed; Bilinear Texture Filtering and You; http://blogs.msdn.com/b/jsteed/archive/2004/08/18/bilinear-texture-filtering-and-you.aspx; dated Aug. 18, 2004, retrieved Nov. 1, 2010.*
Nyland L et al: The impact of dense range data on computer graphics: Multi-View Modeling and Analysis of Visual Scenes, 1999. (MVIEW '99). Proceedings. IEEE Workshop on Fort Collins, CO, USA Jun. 26, 1999, Los Alamitos, CA, USA, IEEE Comput. Soc, US, 1999, pp. 2-10, XP010343233 ISBN: 0-7695-0110-9.

(Continued)

*Primary Examiner* — Kee M Tung
*Assistant Examiner* — Carlos Perromat
(74) *Attorney, Agent, or Firm* — Maschoff Gilmore & Israelsen

(57) ABSTRACT

A laser scanner scans a scene to form a point cloud representing points on a surface within the scene. The point cloud is used to create a corresponding visual representation of the point cloud from a single eye point that is displayed as an image array, such as a cube map, on a computer screen. Each point of the point cloud is represented on the computer screen as a pixel having a value other than a background value. An offset is determined between a reference position of the pixel and an intersection point, which is the point at which a ray from the point to the scanning position intersects a plane coincident with plane of the computer screen including the pixel. The offset is stored in an offset grid, whereby each pixel of the image array has a corresponding offset value in the offset grid. That is, the invention provides for encoding actual point coordinates with respect to the pixels of the image array by storing depth and angular offsets at each pixel in the image array that has an associated point. If the point spacing in a certain region is wider than the image array pixels, the gaps can be filled with, for example, RGB values to make the displayed image continuous.

38 Claims, 3 Drawing Sheets

OTHER PUBLICATIONS

Correa W T et al: "Towards point-based acquisition and rendering of large real-world environments" Computer Graphics and Image Processing, 2002. Proceedings. XV Brazilian Symposium on Fortaleza-ce, Brazil Oct. 7-10, 2002, Los Alamitos, CA, USA, IEEE Comput. Soc, US, Oct. 7, 2002, pp. 59-66, XP010624492, ISBN: 0-7695-1846-X.

Michel P et al: "Online environment reconstruction for biped navigation" Robatics and Automation, 2006, ICRA 2006. Proceedings 2006 IEEE International Conference on Orlando, FL, USA May 15-19, 2006, Piscataway, NJ, USA, IEEE, May 15, 2006, pp. 3089-3094, XP010921733 ISBN: 0-7803-9505-0.

Alferes J et al: "Reconstruction of Three Dimensional Models of Environments with a Mobile Robot" Robotics and Automation, 2005. Proceedings of the 2005 IEEE International Conference on Barcelona, Spain Apr. 18-22, 2005, Piscataway, NJ, USA, IEEE Apr. 18, 2005, pp. 1865-1870, XP010871864, ISBN: 0-7803-8914-X.

\* cited by examiner

IMAGE-MAPPED POINT CLOUD WITH ABILITY TO ACCURATELY REPRESENT POINT COORDINATES

PRIORITY CLAIM

This application claims priority from Provisional Application No. 60/851,444, filed on Oct. 13, 2006, and titled "Cube-Mapped Point Cloud with Ability to Accurately Represent Point Coordinates." Provisional Application No. 60/851,444 is hereby incorporated herein by reference.

BACKGROUND OF THE INVENTION

A laser scanner collects data about its surroundings by collecting thousands, millions or even billions of points of three-dimensional position information. One innovative laser scanner system for collecting such points is described in U.S. Pat. No. 5,988,862, which is incorporated herein by reference. The points, which together are called a point cloud when viewed on or manipulated by a computer, can be collected so densely that they effectively re-create a scene like a photograph. This allows laser scanner users to use the point clouds to view scenes and collect measurements from the point cloud.

While well-known systems allow a user to view the point cloud from various eye points, there are currently no systems that allow a user to view a point cloud interactively, as if the user were in the point cloud or in a scene depicted by the point cloud, while also preserving accuracy, within a user specified tolerance, for measurements taken from the point cloud.

Well-known technology for viewing non-point-cloud data, specifically for viewing a collection of photographic images taken from different angles, allows a user to view the images as if the user were in the scene. This technology allows a user to pan left, right, up or down, and zoom in or out. In one well-known embodiment of this technology, a user takes photographs of an environment, such as a room, in various directions from a single point. These photographs, which cover the floor, ceiling and surrounding area, are then stitched together by a computer to form an image map, e.g., a cube map. The number of images taken to create the cube map varies from two, using fish eye lenses, to fifty or more, using a conventional consumer camera. Each side of the cube map is represented by an image that essentially sums up the contributions from all of the original images to form an efficiently renderable representation. The cube map algorithm, when running on the computer, returns an image or texture based on the input of viewing direction selected by a user.

While adapting image maps to point clouds has desirable visualization benefits, it requires some nontrivial modifications to ensure that a user can use the data to measure distances in the digital scene. Because image maps simply ensure that an image is correctly displayed on a computer monitor, known image map technology only maintains data sufficient to ensure that pixels are displayed properly. Therefore, the data is only as accurate as screen resolution requires. But, in the context of point clouds, individual points are measured by the laser scanner to an accuracy that will generally exceed the resolution at which the point cloud data is viewed.

SUMMARY OF THE INVENTION

In accordance with the present invention, a scene is scanned using a laser scanner system positioned at a scanning position to form a point cloud that represents a plurality of points on a surface or surfaces within the scene. The point cloud is then displayed as an image array on a client-computer screen. Each of the points in the point cloud is represented on the screen as a pixel. For each pixel, an offset is determined between a reference position and a corresponding intersection point. The offset value for each pixel in the image array is stored in an offset grid. The intersection point used for determining the pixel offset value for a point in the point cloud is the point at which a ray from that point to the scanning position intersects a plane that is coincident with the plane of the client-computer screen including the pixel. Range and horizontal and angular information, as well as color information, is stored in the offset grid or in a separate range grid, allowing full 3D coordinates for each point to be recovered. If point spacing in certain regions of the displayed image array is wider than the array pixels, then the "empty" pixels can be filled with values to make the image continuous.

The features and advantages of the present invention will be more fully understood and appreciated by reference to the following detailed description of the invention, which should be considered in conjunction with the accompanying drawings.

DETAILED DESCRIPTION OF THE PREFERRED EMBODIMENT

The present invention provides a point cloud viewing program for viewing point clouds in an integral, panoramic way. That is, a user can rotate the user's viewpoint up and down and right and left. The invention uses image maps to accomplish this visualization technique. In addition, a user can select one point and extract a coordinate in real space for that point or select a pair of points and measure the distance between them. Thus, location data of each point is available, even when viewing the panoramic image array, and the user can choose to make the location data as dimensionally accurate or nearly as dimensionally accurate as the data originally acquired by laser scanner. Those skilled in the art will appreciate that the concepts of the invention apply not only to cube map image representations, in which a number of images are used to form a cube surrounding the eye point, but also apply to other mappings, such as for example, spherical mappings, in which the image coordinates map to a sphere surrounding the eye point (i.e., Mercator projections or similar), cylindrical maps, in which the image coordinates map to a cylinder surrounding the eye point, and orthographic images, in which only the view direction, scale and orientation of the image are set and all image rays are parallel.

In essence, the invention provides for adjusting the location of each pixel representing a point in a point cloud using an offset calculated from the actual data when mapping the points onto the image map.

Figure 1:
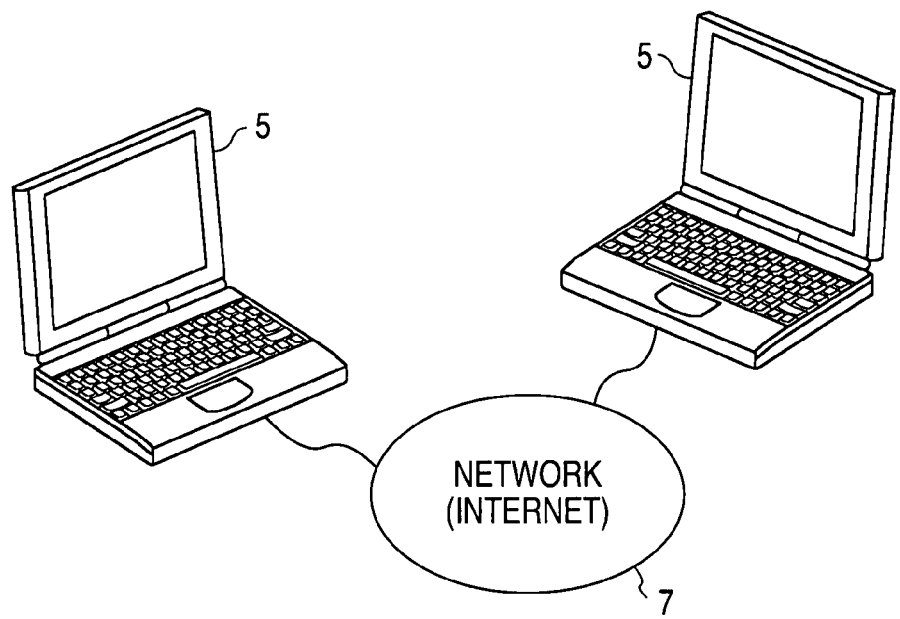
FIG. 1 shows a conventional client-server network, such as the internet.

Other aspects of the invention include creating levels of detail for the point cloud, hyperlinking between views or websites, and marking up point cloud data for communication to other users that are or will be connected to the network. As shown in FIG. 1, preferably, the point cloud viewing program executes in an internet browser running on a client 5 in the context of a network 7.

Figure 3:
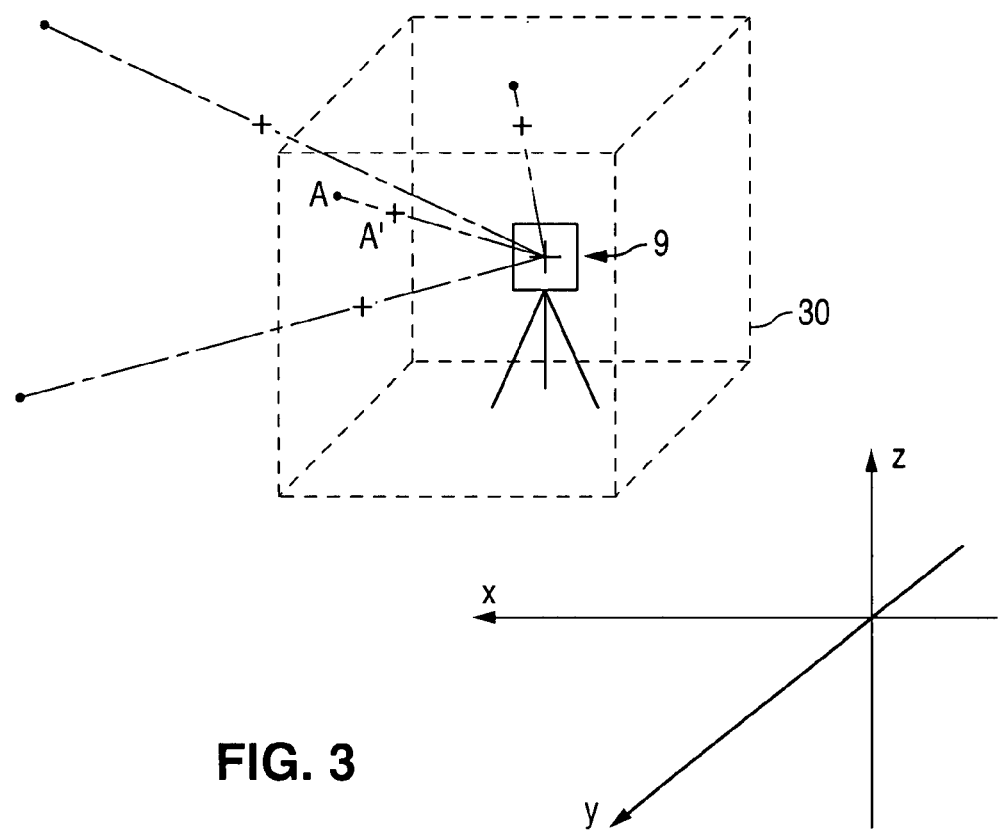
FIG. 3 schematically shows a laser scanner, points collected by the laser scanner, and a mapping of the point to an image pixel space.

Preferably, point cloud data is captured using conventional methods that include scanning a volume or scene using a laser scanner 9, as shown schematically in FIG. 3. The laser scanner 9 is well known, and the point cloud data collected by the laser scanner 9 is in a well known format and can be viewed and manipulated by a computer in well known ways.

A data-publisher user loads the point cloud data to the network 7 and publishes it on a website. A website user can then view the point cloud data using a program in accordance with the invention. The program herein can be stored on a machine readable medium having stored thereon sequences of program instructions, the sequences of program instructions including instructions that when executed by a data processing system, cause the data processing system to perform various acts disclosed herein.

Figure 2:
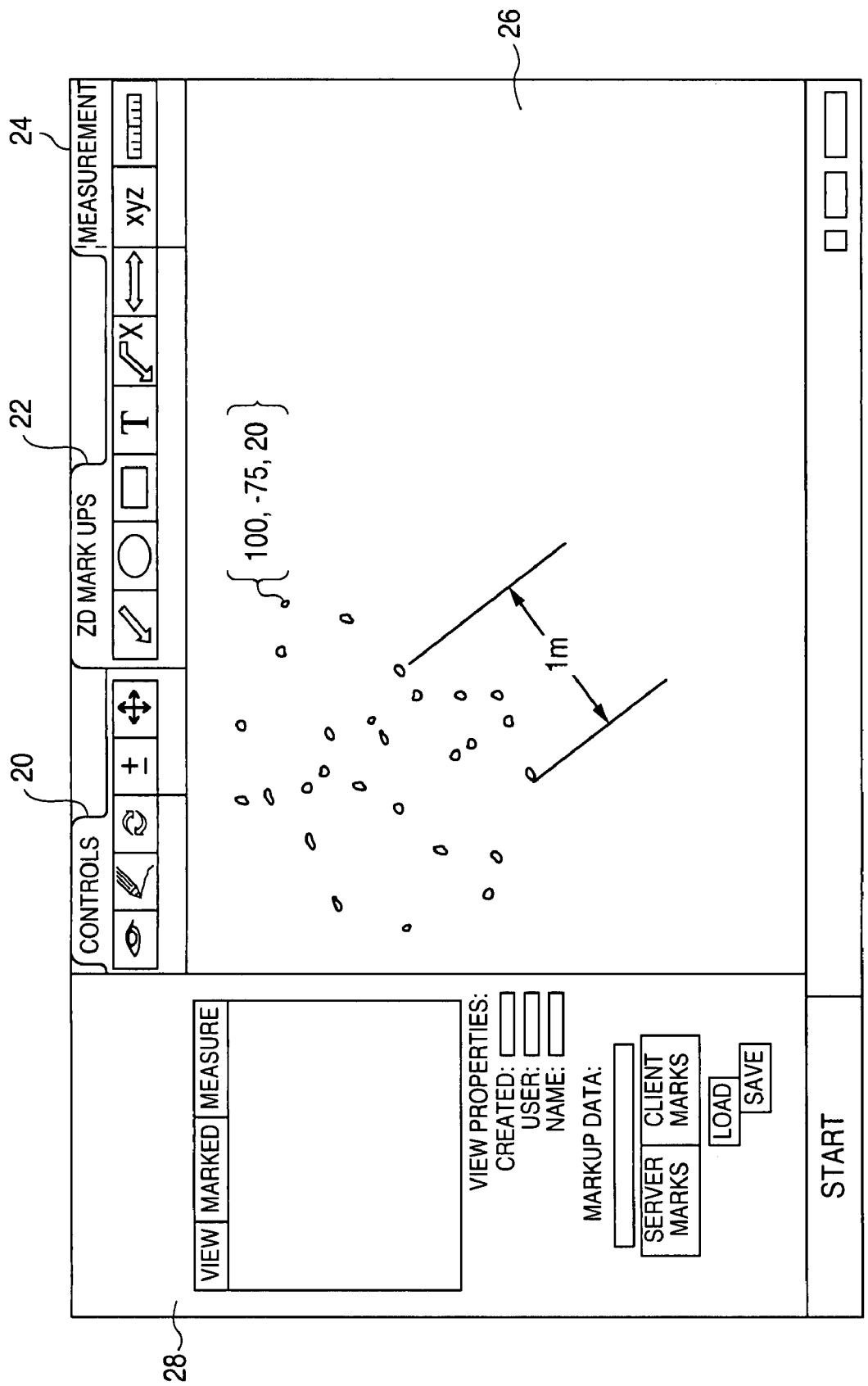
FIG. 2 shows an illustrative graphical user interface and illustrates a feature of the present invention relating to visualizing point coordinates accurately.

The program itself is preferably a plug-in to the internet browser, and for this purpose, is preferably embodied in a markup language, such as XML or HTML, that can be executed by an internet browser, such as MICROSOFT INTERNET EXPLORER or NETSCAPE. When a user that has installed the plug-in program goes to the website established by the data publisher, the program automatically runs in the browser. FIG. 2 shows an illustrative user interface running in a web browser.

The program preferably has several features for users to view and use the data displayed in the internet browser, as shown in FIG. 2. These features are subsumable into controls 20, mark-up features 22 and measurement features 24. The controls 20 include pan/zoom, which simply allows a user to move around the image map of the point cloud data and change the view direction. The controls 20 also include a hypertext mode, which is discussed in more detail below.

The mark-up features 22 include adding text, or comment boxes, or other shapes to the image map for editing. In accordance with the invention, editing users produce edit or mark-up objects, such as text, measurement coordinates and polygons, in a unique layer according to well known processes. FIG. 2 shows an example of a point cloud image map with an added edit layer. The point cloud appears in a view window 26, and a user has added edits including the coordinates of a point (e.g., {100, −75, 20}) and a measurement between points (e.g., 1 meter). In FIG. 2, the point cloud image map is shown schematically; those skilled in the art will appreciate that, in an actual embodiment, the point cloud image map will usually much more closely resemble a realistic scene.

A user may save these edits as a file of a predetermined type. This file is preferably saved on a server and can be accessed and viewed by other users with access to the server. However, the file may be saved to the server, the client, or both. Preferably, a user can simultaneously view several edit layers, from any or all of the server and client, by consecutively loading the layers. The edit file forming the edit layer may include vector objects that communicate distances between points or depict point coordinates in text, as shown in FIG. 2. The file may also include scripts or text boxes communicating miscellaneous instructions or other information.

FIG. 2 shows an illustrative user interface for performing such tasks as saving and loading mark-up layers. The interface includes a side panel 28, which includes such items as a view properties window and graphical instruction modules for saving and loading mark-up layers. The side panel 28 can also convey and allow for input of other information, such as a preferred unit of measurement, hyperlink addresses and file properties. However, the side panel 28 is only one embodiment for performing these tasks and providing this information, and one of ordinary skill in the art will appreciate that a variety of keystrokes or graphical user interfaces can be implemented to perform the same or similar tasks.

The hypertext control freezes an image frame, assigns a name to it, and assigns a hypertext link that, when activated by a user's clicking it, brings up that frame. That is, a hyperlinking user selects a view and chooses a name for it; then the program returns a link string that the hyperlinking user can embed in a different web page that will take a viewer wishing to see the linked page to that view.

This hypertext control does not specifically or only apply to internet hyperlinks. The frozen frame is created as a scene upon which markup objects can be placed. Then, any of these markup objects can have a hyperlink embedded within them or attributed to them such that subsequent users that view the markup can click on the markup object to navigate to the hyperlinked location. Hyperlinks can be any valid linkable location, such as a web location (such as http://www.yahoo.com), but could also be a local location on a computer like c:\filename.pdf or any link the browser, such as an internet browser, knows how to manage.

An additional hyperlinking feature, preferably an additional feature of the program according to the invention, relates to outgoing hyperlinks, in which a user embeds an object, such as a webpage address, into a layer comprising objects. For example, a user adds a mark-up layer to a point cloud image, also called an image frame herein, as shown for example in FIG. 2. This mark-up layer can include coordinates and distance information, as discussed below with reference to FIG. 2, and a link to any external location on the web. In this way, a user can link to information that is relevant to a particular point cloud or any particular view of point cloud data.

The measurement features 24 allow a user to locate points and measure distances between points. Because the point cloud data is handled by the computer as an image (i.e., in the raster domain) rather than handling each point as a vector object, there should be some way to maintain the accuracy of the locational data associated with each point despite the limitations of computer-screen resolution. The following discussion, considered in conjunction with FIG. 3, FIG. 4 and FIG. 5, describes the preferred way to maintain point accuracy.

FIG. 3 illustrates a simple example of a process for determining the offset, which gives the option to maintain the locational accuracy of individual points even when viewed as an image in an internet browser. Suppose the laser scanner 9 scans its surroundings, and suppose a point, point A, on the surface of an object disposed within the surroundings is scanned in 3D coordinates {x, y, z}. (As shown in FIG. 3 various other points are also scanned, but for simplicity, we consider only point A.) An imaginary cube 30 centered at {0,0,0} is aligned to x,y,z so that the front face of the cube is in direction {1, 0, 0}, the top face is {0, 0, 1}, etc. Suppose the cube is defined so the faces are 2 meters by 2 meters and that the cube corners are at: {−1, −1, −1}; {−1, −1, −1,}; . . . ; {1, 1, 1)}. Then, for each point {x, y, z}, the following can be identified: 1) the cube face the ray {0,0,0}—>{x, y, z} passes through; 2) the location A' on the cube face that the ray {0,0,0}—>{x,y,z} passes through; 3) which pixel, when the point cloud data is converted into a series of images that are projected by way of a cube map, on that cube face the ray passes through; and 4) the center coordinate of that pixel and the offset from that center coordinate to the point that the ray passes through. The delta of, or difference between, the center coordinate of that pixel and the offset from that center coordinate to the point that the ray passes through gives the angular offset.

Figure 4:
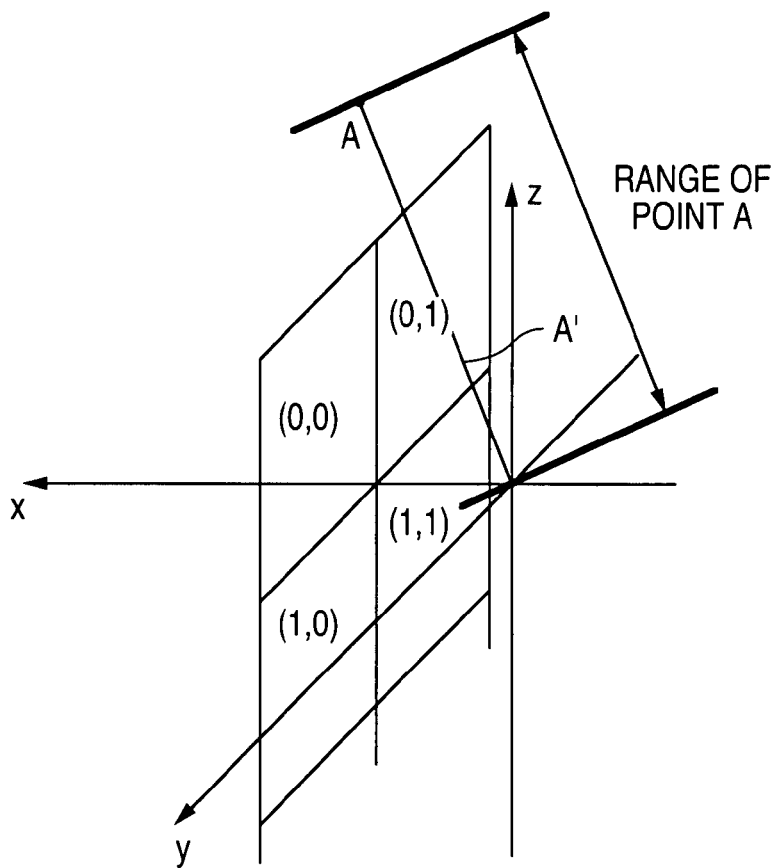
FIG. 4 and FIG. 5 illustrate the FIG. 3 image mapping in greater detail.
Figure 5:
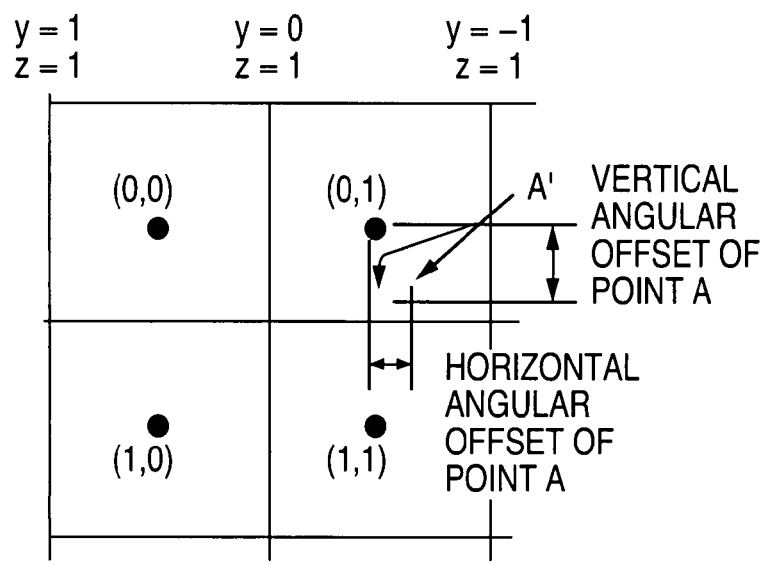

For further explanation by way of example, refer to FIG. 4 and FIG. 5, and assume the following. There are 2 pixels by 2 pixels on the cube faces and the coordinates {x,y,z} of point A equal {100, −75, 20} in the real space coordinate system of FIG. 3. Those skilled in the art will appreciate that these coordinates are determined according to well known principles using the measurements from the laser scanner. Also, point A is located in space so that ray {0,0,0}—>{x,y,z} passes through the cube face that lies in the x==1 plane. Then, by similar triangles (scaling) we have at the intersection of the plane x==1 and the ray, the coordinates for A', which are {1, −0.75, 0.20}. So, as shown in FIG. 5, the ray passes through pixel (0, 1) at location A' on this particular cube face. We can state this another way: a computer must position a pixel containing A' on the screen in such a way that A' appears to represent point A. Determining the position of A' from the data collected by the laser scanner 9 is within the abilities of those skilled in the art.

In a corresponding raster file, at pixel (0,1) we store the range: sqrt(100^2+75^2+20^2), and two angular offsets. The two angular offsets are not necessarily angles, but can be offsets on the cube face. In the above example, the center of pixel (0,1) has coordinates {1, −0.5, 0.5}, so the offsets of the y,z coordinates would be (−0.25, −0.30).

To reconstruct the point given this information, a computer, using the instructions according to a program in accordance with the invention, takes the pixel location (0,1) on this cube face (x==1) and gets coordinate {1, −0.5, 0.5}, then adds the angular offset (−0.25, −0.30) to get {1, −0.75, 0.20}. Then the computer normalizes that vector and multiplies by the range to get {100, 75, 20}. The result can be displayed to a user that selects on a computer screen the representation of point A (as shown in FIG. 2). The result can be used in other ways, such as to calculate the distance between two selected points.

In the above example, the left cube face (in the x==1 plane) is coincident with a computer screen comprising a plurality of pixels, as shown in FIG. 4. One of ordinary skill will appreciate that most computer screens have more than 4 pixels, but extrapolating the concept is within ordinary skill in the art. Also, in the example, point A is represented as pixel (0,1) assuming a particular view direction and field of view. The pixel that represents point A can change in well-known ways as the view direction and field of view changes.

Note that offset coordinates can be stored at any number of levels of precision depending on what precision is needed to accurately reconstruct the point location in 3D space; the tradeoff is that higher precision requires a larger "angular offset image" and thus more bandwidth to load the web page. In this example, we may round the offsets to one decimal place (−0.3, −0.3) to reduce storage and transmission requirements, with a corresponding reduction in accuracy.

Each of the faces for the cube map is a texture map, or grid of pixel locations. The angle offset and range are represented in a corresponding grid of offset pairs, with one entry in the corresponding grid for each entry in the texture map image. So if there is a 50×50 texture map image for a cube face, there would be a corresponding 50×50 offset grid, where pixel (10, 5) on the texture map has its offset stored at (10,5) in the offset grid, and at (10,5) in the range grid. Preferably, the angle offset information is stored relative to the center of the pixel. As the image is transformed to account for changes in view direction and field of view, the same transformation is applied to the angle offset and range grid.

Describing the corresponding grids in another way, the image is a texture made of pixels on an even grid. When the user selects a pixel on the point cloud image, the program determines the row and column location of that pixel and looks up the dimensional location for that row and column position stored in another file, such as an offset and/or range file. The offset grid and the range grid may be separate grids or combined into a single grid that corresponds to the image grid.

One of ordinary skill will appreciate that the coordinates in which the location of points is expressed incorporates an arbitrary origin. The origin can be positioned at a given terrestrial reference point, in the manner of geographic coordinates, or at any other place. An illustrative non-geographic coordinate system includes a system having its origin at a point from which at least some of the points of a point cloud were taken. That is, if points were collected from only one position, the origin of the non-geographic coordinate system could be the one position of the laser scanner 9 at the time of the scan. If points were collected from two or more different positions, the origin could be one of these positions, or another position altogether. The choice of coordinate system is arbitrary and determined by convenience. Transforming from one coordinate system to another is simply a matter of well-known transformation techniques.

As mentioned previously, the offset and range accuracy can be varied according to preferences relating to the size of the file on a computer disk. The user preferably has the authority to set the accuracy.

To facilitate streaming data over the internet, among other purposes, the program preferably gives the browser a starting-point link to an initial file (such as an XML file) and from the starting point it finds a list of all the files it should download and intelligently retrieves them. That is, the starting file is a web page published by a publisher, and this starting file includes links that are automatically followed to other files, including image files (e.g., the texture maps) and markup files (which is a file comprising markup objects, as described previously). The image files are preferably partitioned into levels of detail according to well-known principles. (The files may be partitioned on the fly when needed or partitioned on the storage medium, but preferably on the storage medium.) The browser first brings down the visible images at a level of detail that is appropriate for the user's selected view and allows the user to begin interacting with the images while the program is still working on bringing down the much larger dimensional data. This provides a near-immediate, interactive experience without any heavy weight server installation required on the web or network side.

Those skilled in the art will further appreciate that, in addition to range data and horizontal and angular offset data, the stored value for each pixel in the point cloud will preferably also include red/green/blue (RGB) or greyscale color data, or some other value that can be converted to a color or greyscale value for displaying the image on the screen.

The mapping techniques of the present invention also provide for filling the gaps in the displayed image array to form a continuous image. For example, if the point spacing in a certain region of the point cloud is wider than the pixels in the image array, the "empty" pixels can filled with, for example, RGB values to make the image continuous. The following exemplary methods can be used to accomplish this: (1) a proximity tolerance, i.e., if the points are within the tolerance distance, interpolate their characteristics (e.g., color) to fill in the intermediate pixels; (2) scan grid neighbors, i.e., if the points are on adjacent rows or columns of the scan, interpolate to fill in the intermediate pixels; (3) using colors from texture mapped images, i.e., if a texture map image is applied to color the points, then apply the texture map to the pixels that contain no points by interpolating the texture coordinates of the neighboring points of the pixel and using the texture coordinates to determine the color from the texture map.

It should be understood that various alternatives to the embodiments of the invention described herein may be employed in practicing the invention. It is intended that the following claims define the scope of the invention systems and methods within the scope of these claims and their equivalents be covered thereby.

The invention claimed is:

1. A method of displaying a scene, the method comprising:
    scanning a scene to form a point cloud representing at least one point on a surface within the scene;
    displaying the point cloud as an image array on a display screen such that the at least one point is represented on the display screen as a pixel;
    determining location data for the at least one point by determining an offset between a reference position of the at least one pixel and an intersection point, the reference position being located on the pixel, the intersection point being the point at which a ray from the at least one point to the scanning position intersects the pixel, wherein the offset comprises data describing the position of the intersection point relative to the reference position; and
    storing the location data; wherein the offset is added to the reference position of the at least one pixel, the result normalized and multiplied by a range of a point visible in the at least one pixel in order to obtain a 3D coordinate of the point visible in the at least one pixel.

2. A method as in claim 1, and wherein the storing step comprises:
    storing the range of the point in a grid corresponding to the image pixels; and
    storing the offset in the grid corresponding to the image pixels.

3. A method as in claim 1, further comprising:
    transforming the offset determined based at least on changes in view direction and/or field of view.

4. A method of displaying a scene, the method comprising:
    scanning a scene from a scanning position to form a point cloud representing at least one point on a surface within the scene observed from the scanning position;
    displaying the point cloud as an image array on a computer screen such that the at least one point is represented on the computer screen as a pixel having a value other than a background value;
    determining an offset between a reference position of the at least one pixel and an intersection point, the reference position being located on the pixel, the intersection point being the point at which a ray from the at least one point to the scanning position intersects the pixel, wherein the offset comprises data describing the position of the intersection point relative to the reference position; and
    storing the offset in an offset grid; wherein the offset is added to the reference position of the at least one pixel, the result normalized and multiplied by a range of a point visible in the at least one pixel in order to obtain a 3D coordinate of the point visible in the at least one pixel.

5. A method as in claim 4, and wherein the storing step includes storing a range value of the point in an offset grid corresponding to the image pixels.

6. A method as in claim 4, and wherein the image array comprises a cube map image.

7. A method as in claim 4, and wherein the image array comprises a spherical mapping.

8. A method as in claim 4, and wherein the image array comprises a cylindrical mapping.

9. A method as in claim 4, and wherein the image array comprises an orthographic image mapping.

10. A method as in claim 4, and wherein the step of displaying the point cloud comprises providing the image array for interactive use by a computer user.

11. A method as in claim 10, and wherein the interactive use comprises editing of the image array by the computer user to provide an edited image array.

12. A method as in claim 11, and wherein the editing of the image array comprises adding content to the image array.

13. A method as in claim 12, and wherein the added content comprises a markup object.

14. A method as in claim 13, and wherein the markup object comprises text.

15. A method as in claim 13, and wherein the markup object comprises a comment box.

16. A method as in claim 12, and wherein the added content comprises the coordinates of the at least one point.

17. A method as in claim 12, and wherein the added content comprises a measurement value between the at least one point and a second point in the point cloud.

18. A method as in claim 12, and further comprising:
    saving the edited image.

19. A method as in claim 12, and further comprising:
    saving the edited image for access and viewing by another computer user.

20. A method as in claim 4, further comprising:
    transforming the offset determined based at least on changes in view direction and/or field of view.

21. A non-transitory machine readable medium having stored thereon sequences of program instructions, the sequences of program instructions including instructions that when executed by a data processing system, cause the data processing system to perform:
    providing access to a point cloud representing a plurality of points on surfaces within a scene that is observed from a scanning position;
    displaying the point cloud as an image array on a computer screen such that each of the points is represented on the computer screen as a pixel;
    determining location data for each of the points by determining an offset between a reference position of the at least one pixel and an intersection point, the reference position being located on the pixel, the intersection point being the point at which a ray from the at least one point to the scanning position intersects the pixel, wherein the offset comprises data describing the position of the intersection point relative to the reference position; and
    storing the location data; wherein the offset is added to the reference position of the at least one pixel, the result normalized and multiplied by a range of a point visible in the at least one pixel in order to obtain a 3D coordinate of the point visible in the at least one pixel.

22. A non-transitory machine readable medium as in claim 21, and wherein the image is selected from the group consisting of a cube map image, a spherical mapping, a cylindrical mapping and an orthographic image mapping.

23. A non-transitory machine readable medium as in claim 21, and wherein displaying the point cloud comprises providing the image array for interactive use by a computer user.

24. A non-transitory machine readable medium as in claim 23, and wherein the interactive use comprises editing the image array to provide an edited image array.

25. A non-transitory machine readable medium as in claim 24, and wherein the sequence of instructions includes at least one instruction for saving the edited image array.

26. A non-transitory machine readable medium as in claim 24, and wherein editing the image array comprises adding content to the image array.

27. A non-transitory machine readable medium as in claim 26, and wherein the added content comprises the coordinates of a point in the image array.

28. A non-transitory machine readable medium as in claim 26, and wherein the added content comprises a measurement value between two points in the image array.

29. A non-transitory machine readable medium as in claim 21, further comprising:
   transforming the offset determined based at least on changes in view direction and/or field of view.

30. A method comprising:
   scanning a scene with a laser scanner to form a point cloud representing a plurality of points on a surface or surfaces within the scene, the laser scanner being positioned at a scanning position;
   displaying the point cloud as an image array on a computer screen, whereby each of the plurality of points is represented on the computer screen as a pixel having a value other than a background value;
   for each of the plurality of points, determining an offset value between a reference position of the pixel and an intersection point, the reference position being located on the pixel, the intersection point being a point at which a ray from a point corresponding to the pixel to the scanning position intersects the pixel, wherein the offset value describes the position of the intersection point relative to the reference position; and
   storing the offset in an offset grid, whereby each pixel of the image array has a corresponding offset value stored in the offset grid; wherein the offset is added to the reference position of a pixel of the plurality of pixels, the result normalized and multiplied by a range of a point visible in the pixel in order to obtain a 3D coordinate of the point visible in the pixel
   storing the offset values as an offset grid, whereby each pixel of the image array has a corresponding offset value stored in the offset grid.

31. A method as in claim 30, and wherein the image array comprises a cube map image.

32. A method as in claim 30, and wherein the reference position is the center of the pixel.

33. A method as in claim 30, and further comprising:
   storing range data in the offset grid.

34. A method as in claim 30, and further comprising:
   storing range data in a range grid that is separate from the offset grid.

35. A method as in claim 30, and wherein, in the event that the point spacing is wider than the image array pixels, providing additional pixels to the image array to provide a continuous image.

36. A method as in claim 30, further comprising:
   transforming the offset determined based at least on changes in view direction and/or field of view.

37. A scanning system comprising:
   a laser scanner operable to scan a scene from a scanning position to form a point cloud image that represents a plurality of points on a surface or surfaces within the scene;
   a display for displaying the point cloud as an image array, such that each of the plurality of points is represented as a pixel having a value other than a background value;
   a data processing system for determining, for each of the plurality of points, an offset between a reference position of a pixel and an intersection point, the reference position being located on the pixel, the intersection point being a point at which a ray from the point corresponding to the pixel to the scanning position intersects the pixel and for transforming the offset determined based at least on changes in view direction and/or field of view, wherein the offset comprises data describing the position of the intersection point relative to the reference position; and
   memory for storing the offset of each point as an offset grid, such that each pixel of the image array has a corresponding offset stored in the offset grid; wherein the offset is added to the reference position of the pixel, the result normalized and multiplied by a range of a point visible in the pixel in order to obtain a 3D coordinate of the point visible in the pixel.

38. A scanning system as in claim 37, and wherein the image array comprises a cube map image.

* * * * *